United States Patent
Yasue (10) Patent No.: US 7,526,608 B2
(45) Date of Patent: Apr. 28, 2009

(54) METHODS AND APPARATUS FOR PROVIDING A SOFTWARE IMPLEMENTED CACHE MEMORY

(75) Inventor: Masahiro Yasue, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 310 days.

(21) Appl. No.: 11/136,022

(22) Filed: May 24, 2005

(65) Prior Publication Data

US 2005/0268038 A1    Dec. 1, 2005

Related U.S. Application Data

(60) Provisional application No. 60/575,444, filed on May 28, 2004.

(51) Int. Cl.
*G06F 12/00* (2006.01)

(52) U.S. Cl. .................. 711/121; 711/128; 711/129

(58) Field of Classification Search ............... None
See application file for complete search history.

(56) References Cited

U.S. PATENT DOCUMENTS

| | | | |
|---|---|---|---|
| 5,504,901 A * | 4/1996 | Peterson | 717/144 |
| 5,966,734 A * | 10/1999 | Mohamed et al. | 711/173 |
| 6,526,491 B2 | 2/2003 | Suzuoki et al. | |
| 2002/0156980 A1 | 10/2002 | Rodriguez | |

FOREIGN PATENT DOCUMENTS

| | | |
|---|---|---|
| EP | 0777183 A | 6/1997 |
| JP | 2002-351850 | 12/2002 |
| WO | WO 02/077846 A1 | 10/2002 |
| WO | WO 02/079995 A1 | 10/2002 |

OTHER PUBLICATIONS

Japanese Office Action for Japanese Patent No. 2005-153848, dated Sep. 6, 2005, 5 pgs.
Iyengar et al., "Design And Performance Of A General-Purpose Software Cache," Proceedings of IPCCC'99, IEEE, Feb. 10, 1999, pp. 329-336.
Nanri et al., "Effects of Static Management of Software-Implemented Cache Memory System on Distributed Shared Memory System," IPSJ Technical Papers, Japan, IPSJ, Sep. 15, 1997, vol. 38, No. 9, pp. 1859-1868.

(Continued)

*Primary Examiner*—Reginald G Bragdon
*Assistant Examiner*—Thanh D Vo
(74) *Attorney, Agent, or Firm*—Matthew B. Dernier, Esq.; Gibson & Dernier LLP (57) ABSTRACT

Methods and apparatus provide a processor for operative connection to a main memory for storing data, the processor being operable to request at least some of the data for use; and a local memory in operative connection with the processor such that the data may be stored therein for use by the processor, the local memory not being a hardware cache memory, wherein the processor is operable to execute application program interface code that configures the local memory to include at least one software invoked cache memory area therein.

9 Claims, 8 Drawing Sheets

OTHER PUBLICATIONS

Notification of Transmittal of the International Search Report and the Written Opinion of the International Searching Authority, or the Declaration, dated Sep. 20, 2005.

International Search Report, dated Sep. 20, 2005.

Written Opinion of the International Searching Authority, dated Sep. 20, 2005.

Nanri et al., Using Cache Optimizing Compiler for Managing Software Cache on Distributed Shared Memory System, Proceedings of HPC Asia '97, Apr. 28, 1997, pp. 312-318.

National Search Report for corresponding EP 05745794, Dec. 1, 2008.

* cited by examiner

METHODS AND APPARATUS FOR PROVIDING A SOFTWARE IMPLEMENTED CACHE MEMORY

CROSS-REFERENCE TO RELATED APPLICATIONS

This application claims the benefit of U.S. Provisional Patent Application No. 60/575,444, filed May 28, 2004, the entire disclosure of which is hereby incorporated by reference.

BACKGROUND OF THE INVENTION

The present invention relates to methods and apparatus for providing a software implemented cache memory within a local memory of processor having access to an external system memory.

Real-time, multimedia applications are becoming increasingly important. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

In recent years, there has been an insatiable desire for faster computer processing data throughputs because cutting-edge computer applications are becoming more and more complex, and are placing ever increasing demands on processing systems. Graphics applications are among those that place the highest demands on a processing system because they require such vast numbers of data accesses, data computations, and data manipulations in relatively short periods of time to achieve desirable visual results. Conventional processors have very rapid cycle times (i.e., the unit of time in which a microprocessor is capable of manipulating data), on the order of a nanosecond or less, although the time required to access data stored in main memory may be considerably higher than the cycle time of the microprocessor. For example, the access time required to obtain a byte of data from a main memory implemented using dynamic random access memory (DRAM) technology is on the order of about 100 nanoseconds.

In order to ameliorate the bottleneck imposed by the relatively long access time to DRAM memory, those skilled in the art have utilized cache memories. A cache memory is significantly faster than DRAM memory, and augments the function of data storage provided by the main memory. For example, an L2 cache memory may be coupled externally to the processor or an L1 cache memory may be coupled internally with the processor, which memories are significantly faster than a main (or system) memory implemented utilizing DRAM technology. An L2 cache memory may be implemented utilizing, for example, static random access memory (SRAM) technology, which is approximately two to three times faster than DRAM technology. An L1 cache memory is usually even faster than an L2 cache memory.

Due to the relatively high cost of cache memories, they are typically much smaller than main memory. Consequently, conventional algorithms have been employed to determine what data should be stored in the cache memory. These conventional algorithms may be based on, for example, the theoretical concept of "locality of reference," which takes advantage of the fact that relatively small portions of a large executable program and associated data are used at any particular point in time. Thus, in accordance with the concept of locality of reference, only the small portions of the overall executable program are stored in cache memory at any particular point in time.

The particularities of the known algorithms for taking advantage of locality of reference, or any other concept, for controlling the storage of data in a cache memory are too numerous to present in this description. Suffice it to say, however, that not every algorithm is suitable in all applications as the data processing goals of various applications may differ significantly. Further, in situations where there is weak data storage locality and/or little sequential memory access (e.g., the portions of the program and data that are needed are randomly located to some extent), little advantage is obtained by using a cache memory architecture.

The conventional approach to cache memory implementation requires a hardware cache memory located on chip (L1 cache) or off chip (L2 cache), which are expensive and take up valuable space. A decision to employ a cache memory arrangement, therefore, should not be made without serious consideration. As there is no guarantee that a cache memory arrangement will yield advantageous performance in many instances, some processing systems do not employ them. Unfortunately, the decision not to employ a hardware implemented cache memory has the disadvantageous effect of limiting processing throughput in those situations where some degree of locality of reference exists.

Accordingly, there are needs in the art for new methods and apparatus for implementing a cache memory, which may exploit at least some of the advantages of a hardware implemented cache memory without incurring the disadvantageous cost implications in terms of expense and usage of space.

SUMMARY OF THE INVENTION

In processors having a local memory in which to execute processing tasks and a system memory, but no traditional hardware cache capabilities, undesirable memory access latency may result. An inventive solution to this latency problem is to provide a software implemented cache capability within the local memory of the processor. In accordance with one or more aspects of the present invention, one or more distinct software implemented cache memories may be invoked within the local memory by programming one or more application programming interface (API) code. Further, the number of distinct cache memory sections, the number of cache lines per memory, the number of tag comparisons per instruction, the line block size, and certain aspects of the replacement policy may be configured via the API codes. This provides a significant advantage over hardware implementations in which these parameters are fixed.

In accordance with at least one aspect of the present invention, methods and apparatus provide for a processor for operative connection to a main memory for storing data, such as program code and associated data that is manipulated or otherwise used thereby. As used herein, the term data is broadly defined to include application program code, system level program code, data to be manipulated or otherwise used, operand data, data streams, etc. The processor is operable to request at least some of the data for use and/or execution. A local memory is in operative connection with the processor such that the data may be stored therein for use by the processor. Notably, the local memory is not a hardware cache memory. The processor is operable to execute application program interface code that configures the local memory to include at least one software invoked cache memory area therein. Preferably, the processor is operable to invoke a plurality of distinct software cache memory areas.

Further, the processor is preferably operable to specify at least one of the following parameters using the application program interface code: a number of cache lines to include in the at least one software invoked cache memory area; a size of the cache lines; specific areas of the main memory from/to which to read/write the data; a data size of the data that may be read from, or written to, the main memory in each such read/write cycle; and a cache line replacement policy.

The processor may be operable to (i) compute a cache penalty based on at least one of a cache hit ratio and a cache access frequency; and (ii) reconfigure parameters of the software invoked cache memory area in response to the computation result.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PRESENT INVENTION

Figure 1:
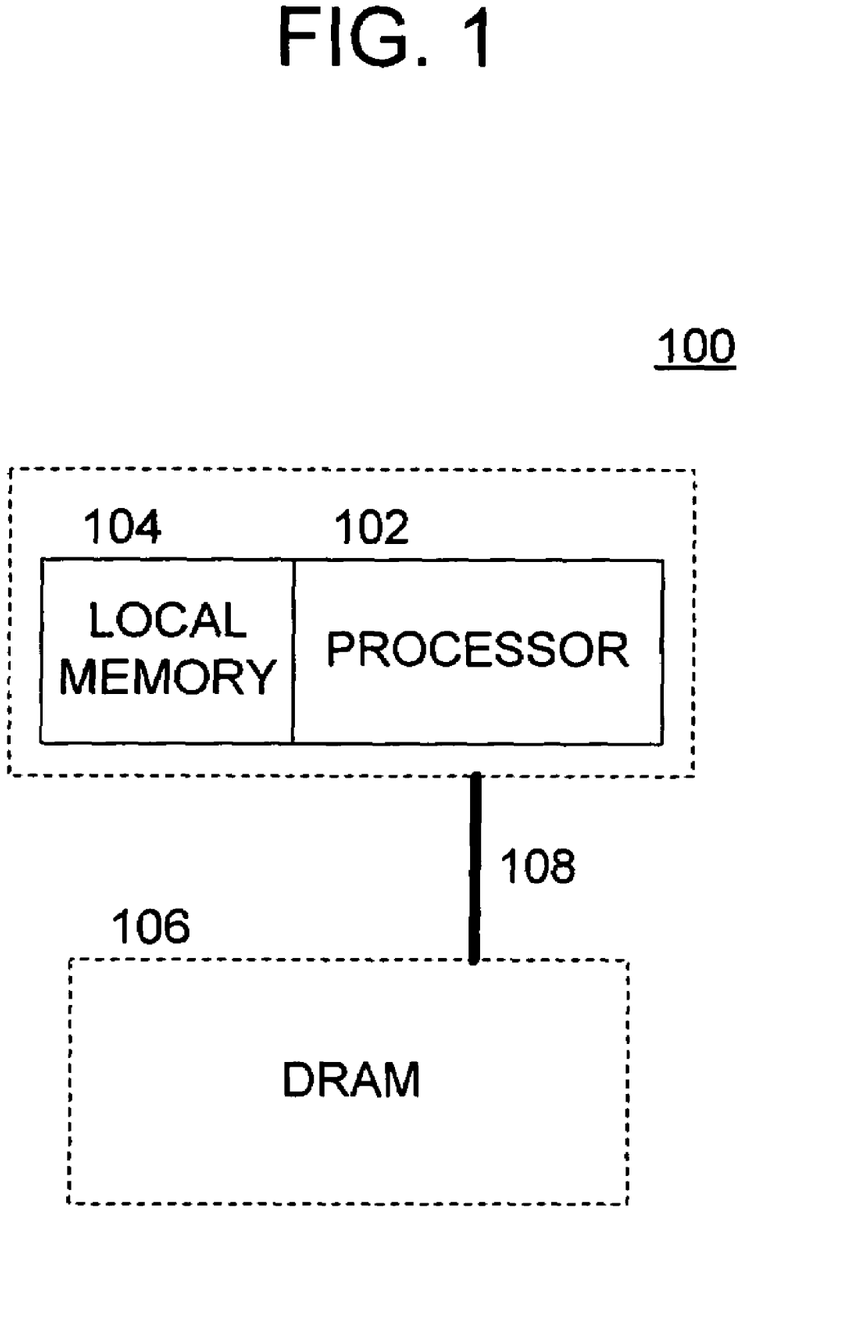
FIG. 1 is a diagram illustrating a processing system in accordance with one or more aspects of the present invention.

With reference to the drawings, wherein like numerals indicate like elements, there is shown in FIG. 1 a processing system 100 suitable for employing one or more aspects of the present invention. For the purposes of brevity and clarity, the block diagram of FIG. 1 will be referred to and described herein as illustrating an apparatus 100, it being understood, however, that the description may readily be applied to various aspects of a method with equal force. The apparatus 100 preferably includes a processor 102, a local memory 104, a system memory 106 (e.g., a DRAM), and a bus 108.

The processor 102 may be implemented utilizing any of the known technologies that are capable of requesting data from the system memory 106, and manipulating the data to achieve a desirable result. For example, the processor 102 may be implemented using any of the known microprocessors that are capable of executing software and/or firmware, including standard microprocessors, distributed microprocessors, etc. By way of example, the processor 102 may be a graphics processor that is capable of requesting and manipulating data, such as pixel data, including gray scale information, color information, texture data, polygonal information, video frame information, etc.

Notably, the local memory 104 is located in the same chip as the processor 102; however, the local memory 104 is preferably not a traditional hardware cache memory in that there are no on chip or off chip hardware cache circuits, cache registers, cache memory controllers, etc. to implement a hardware cache memory function. As on chip space is often limited, the size of the local memory 104 may be much smaller than the system memory 106. The processor 102 preferably provides data access requests to copy data (which may include program data) from the system memory 106 over the bus 108 into the local memory 104 for program execution and data manipulation. The mechanism for facilitating data access may be implemented utilizing any of the known techniques, such as direct memory access (DMA) techniques.

It is noted that in some circumstances, the limited size of the local memory 104 may require numerous data accesses to the system memory 106 to complete a particular processing function. For example, the well known KD-tree search technique used in raytracing (pixel based image rendering) may require access to well over 1 MB of data within the system memory. As the local memory may be much smaller than 1 MB (such as 256 KB), and as the incremental amount of data that may be copied to the local memory 104 may be even smaller still (128 B), numerous data accesses to the system memory 106 may be required (with attendant access latency) to complete the raytracing function.

Figure 2:
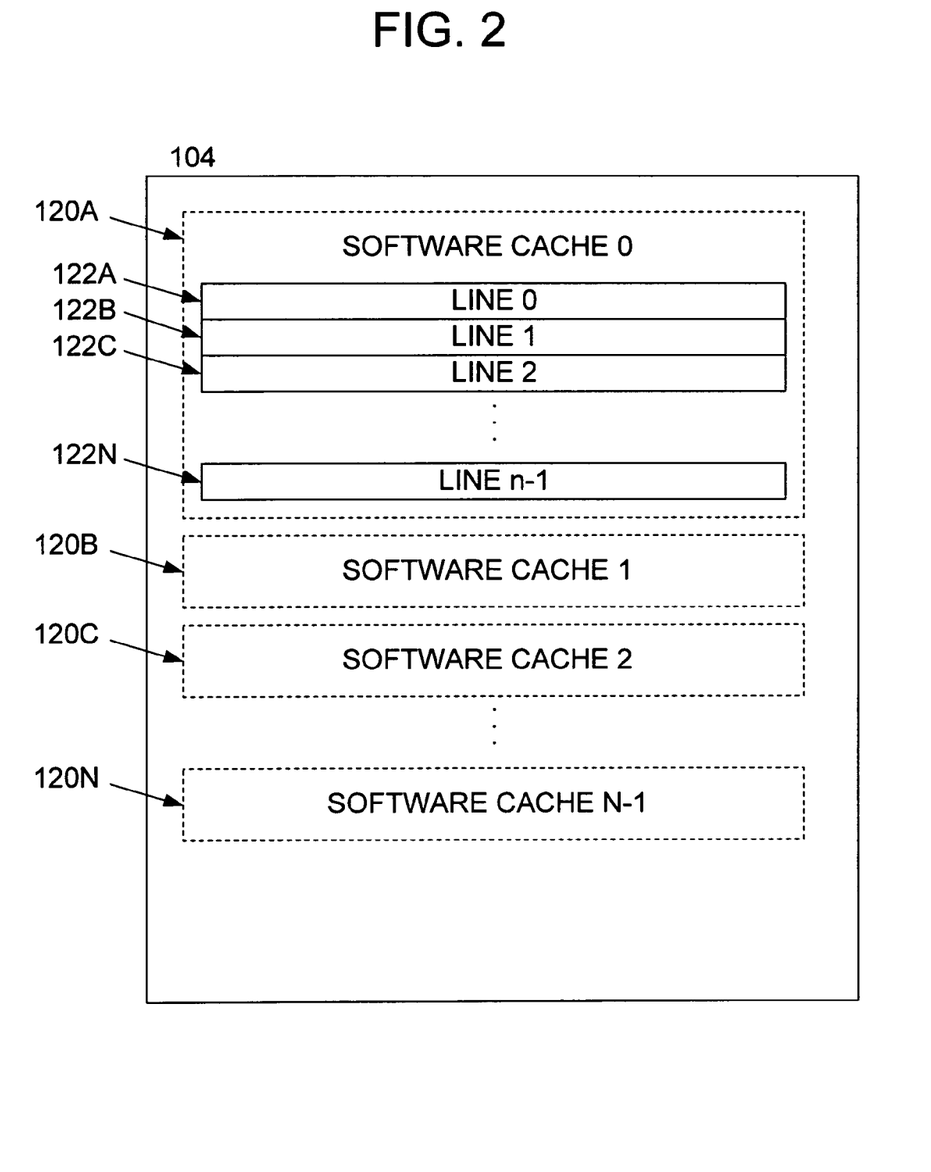
FIG. 2 is a diagram illustrating a local memory of the processing system of FIG. 1 including one or more software implemented cache memories in accordance with one or more further aspects of the present invention.

In accordance with one or more embodiments of the invention, however, the number of data accesses to the system memory 106 may be reduced by way of a software implemented cache within the local memory 104. FIG. 2 illustrates a conceptual diagram of the local memory 104 of the processing system 100. The local memory 104 may include one or more software invoked cache memory areas 120A, 120B, 120C, . . . 120N. Each of the software invoked cache memory areas 120 may be implemented by execution of application program interface (API) code by the processor 102. Again, the local memory 104 is not a traditional hardware cache memory in that there are no on chip or off chip hardware cache circuits, cache registers, cache memory controllers, etc. to implement a hardware cache memory function. The software invoked cache memory areas 120, however, are not implemented using such hardware, rather these areas are formed using software code. For example, with reference to FIG. 3, the processor 102 may specify a number of parameters of the software cache 120A utilizing the API code. At action 300, the processor 102 may specify a cache entry size, which indicates a number of cache lines 122 to include in the software invoked cache memory area 120A. As illustrated in FIG. 2, there may be any number of lines specified, such as four. The processor 102 may also specify a line size using the API code, where the line size specifies the extent of each cache line 122 within the software invoked cache memory area(s) 120A-N. Suitable API code that a programmer may use in a program to specify the cache entry size and line size may be expressed as follows:

char cache_buf[entry][line_size].

Figure 3:
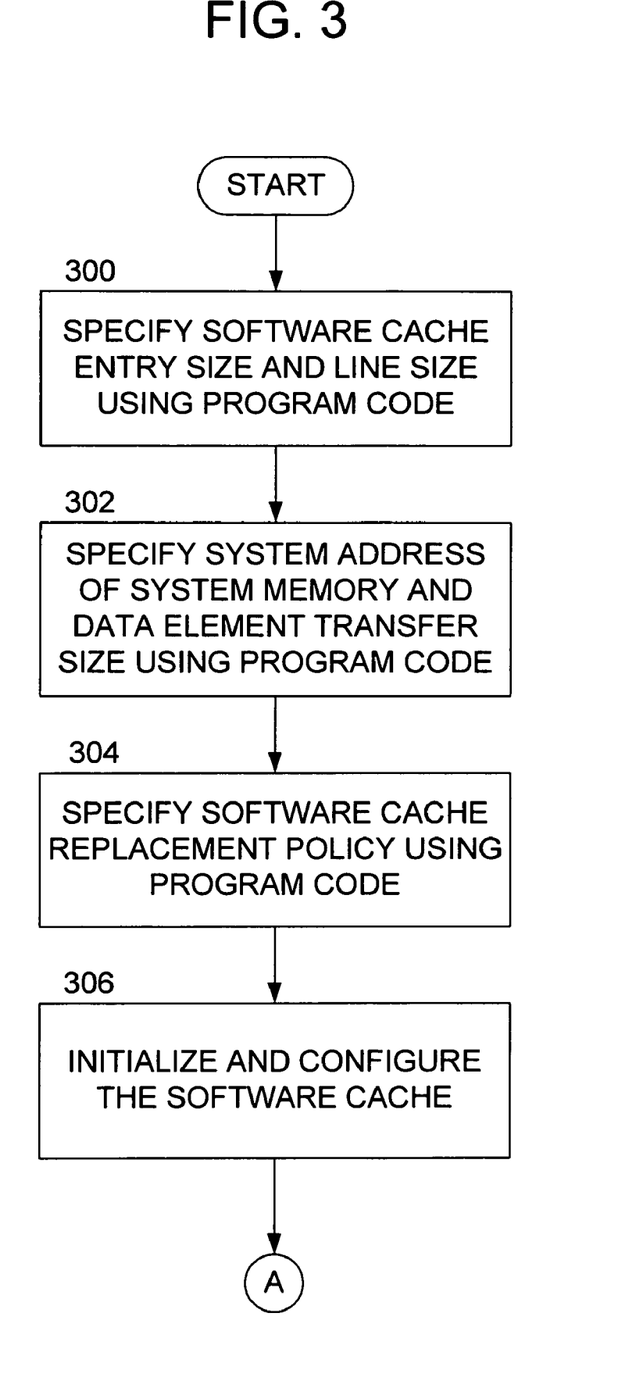
FIG. 3 is a flow diagram illustrating process steps that may be carried out by the processing system of FIG. 1 in accordance with one or more aspects of the present invention.

The processor 102 is also preferably operable to specify a system address of the main memory 106 in order to define a point (usually a starting point) within the system memory 106 from which to define specific areas of the system memory 106 (action 302). Data are read from or written to these areas vis-à-vis the software invoked cache memory area 120A. The processor 102 is also preferably operable to specify a data element transfer size (or element size), which is a data size that is read from, or written to, the system memory 106 in each such read/write cycle (action 302). For example, the specified system address in the main memory 106 may be 1000 and the data element transfer size may be 100. Thus, the system memory 106 may be segmented into specific areas: area 0, area 1, area 2, etc., where area 0 extends from address 1000 to address 1099, area 1 extends from address 1100 to address 1199, area 2 extends from address 1200 to address 1299, etc. The real address in the system memory 106, therefore, may be expressed as follows: real address=system address (or base address)+(data element transfer size)×element ID. The element ID is a number that corresponds with a particular one of the areas of the system memory 106, for example, ID=0 corresponds with area 0, ID=1 corresponds with area 1, etc. A suitable API code that a programmer may use to specify the system address and data element size may be expressed as follows:

void init_cache (unit address, unit size).

It is noted that the processor 102 is preferably further operable to specify a data (or cache line) replacement policy (action 304), such as the least recently used (LRU) technique or any of the other well-known algorithms for replacing data within a cache memory. In an alternative embodiment, a "hint" may indicate which cache lines should be replaced before others, such as by giving each line a particular priority for replacement. For example, each of the cache lines 122 A-N of the software cache 120A may be assigned a priority value that indicates whether such lines should be replaced before or after the other lines in the cache.

Once the cache entry size, line size, system address, and data element size parameters are established by way of the API code, the processor 102 may initialize and configure the software invoked cache memory area 102A within the local memory 104 (action 306). Thereafter, data may be read from or written into the software cache areas 120 utilizing suitable API code that specifies an element ID and indicates whether data are to be read or written. Suitable API code that a programmer may utilize in this regard may be expressed as follows:

void*get_cache (int id, int control).

Figure 4:
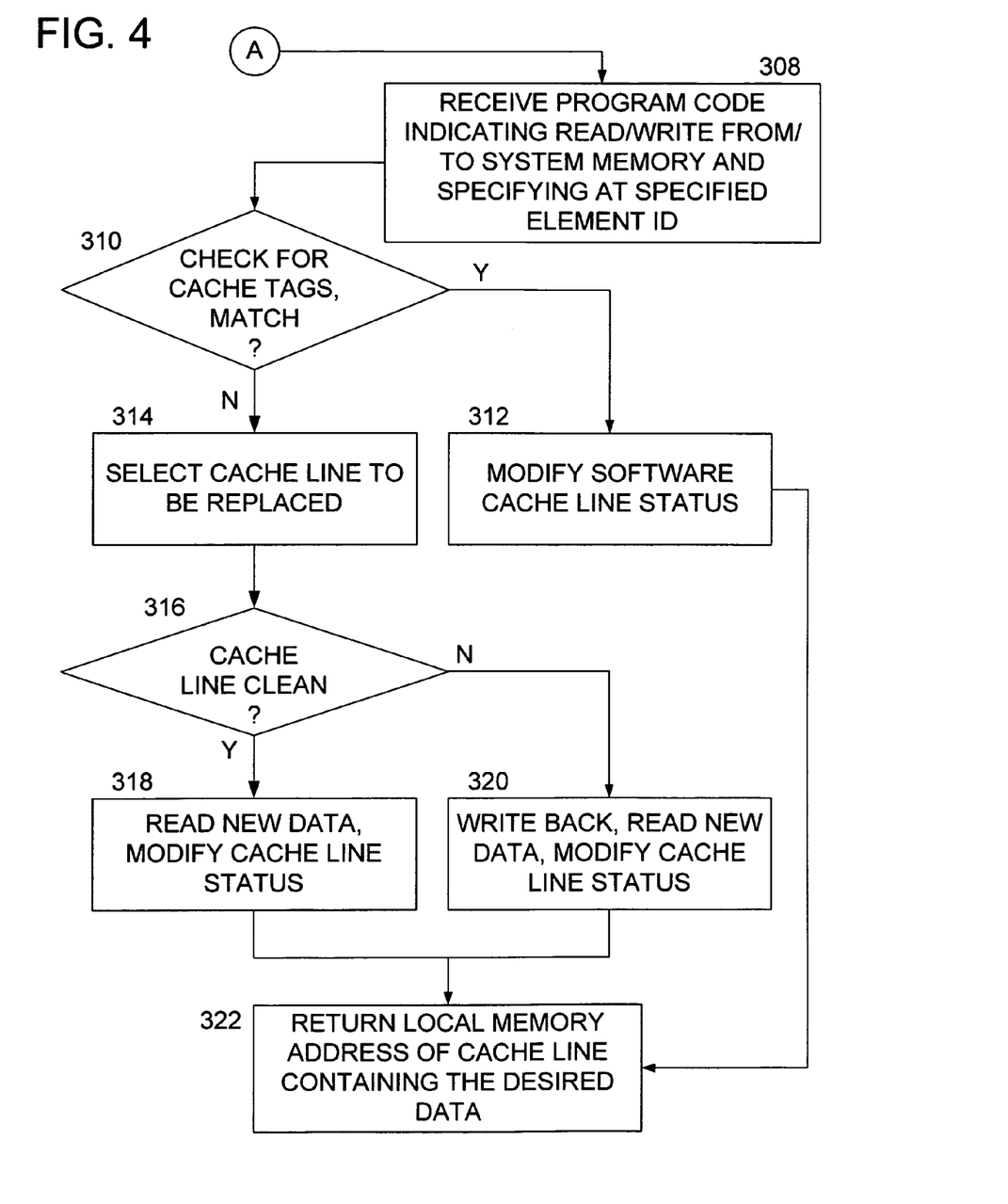
FIG. 4 is a flow diagram illustrating further process steps that may be carried out by the processing system of FIG. 1 in accordance with one or more further aspects of the present invention.

After initialization and configuration of the software invoked cache memory area(s), the processor 102 may execute suitable programming code to achieve a cache memory function. For example, as illustrated in FIG. 4, at action 308 the program code may indicate a read from the system memory 106 by specifying a particular element ID. At action 310, a determination is made as to whether the desired data is contained within one of the cache lines 122 of the software cache 120. This may be achieved by assigning cache tags to each cache line 122 and checking to see whether a cache tag matches the data stored in any cache line. If the answer is in the affirmative, then the process flow advances to action 312, where the status of the particular cache line 122 is modified such as indicating that the cache line has been hit, changing the LRU values, changing the hint (or priority) values, etc. Thereafter, the process flow advances to action 322, where the address in local memory of the cache line that was hit is returned such that the desired data may be obtained and processed.

Turning again to action 310, if none of the cache tags match and the determination is in the negative, then a cache miss occurs and the process flow advances to action 314. At action 314, a cache line is selected to be replaced, in accordance with the replacement policy. For example, if the least recently used technique is employed, then the cache line that has been hit least recently is selected. At action 316, a determination is made as to whether the selected cache line is clean, meaning that the data of the cache line has not been modified. If the data of the cache line are clean, then the process flow advances to action 318, where new data are read from the system memory 106 corresponding to the specified element ID and stored in the selected cache line 122. Thereafter, the process flow advances to action 322, where the address of the local memory of the selected cache line are returned such that desired data may be obtained and manipulated.

Turning again to action 316, if the data of the selected cache line are not clean, then the process flow advances 320, where the data of cache line are written back to the system memory 106 and the new data specified by the element ID are read and written to the specified cache line. Thereafter, the process flow advances to action 322, where the address of the local memory of the selected cache line are returned such that the desired data may be obtained and manipulated.

As a further example of how the software invoked cache memory may be used, the processor 102 may receive a reference to position independent code, for example within a data stream coming from the DRAM 106 or from a network connection (not shown). Position independent code executes properly regardless of its memeory location. In response, the processor determines whether the position independent code is located in the cache memory area 120 of the local memory 104 and, if so, retrieves the position independent code from the cache memory area 120. Thereafter, the retrieved position independent code may be used, for example, in an executable program.

It is noted that the circumstances in which the API code for implementing a software involved cache memory area may be used in accordance with the above description are too numerous to describe in their entirety. By way of example, however, the software invoked cache memory area may be useful in finding the leaf node in the searching of the KD Tree process. The following op-code illustrates how a programmer may utilize the software invoked cache memory area concept:

```
init_cache (KDTREE_ADDRESS, sizeof (KDTree));
node = (DKTree*) get_cache (id, READ);
while (node->nextid != -1) {
    id = node->nextid;
    node = get_cache (id, READ);
}
```

In accordance with one or more further aspects of the present invention, the processor 102 is preferably operable to compute at least one of a cache hit ratio and a cache access frequency associated with one or more of the software invoked cache memory areas 120. The cache hit ratio, P, is a value between 0 and 1 indicating the percentage that desired data exist in a given software invoked cache memory area 120 when requests for such data are made. The cache access frequency, N, is a value indicating the number of times per second that the given software invoked cache memory area 120 is accessed. The cache penalty may be computed in accordance with the following equation:

$$\text{cache penalty} = N \times P \times Chit + N \times (1-P) \times Cmiss,$$

where Chit represents the cache penalty for hit and Cmiss represents the cache penalty for a miss. The cache penalty may be compared with the penalty associated with not having a cache to determine whether the software invoked cache memory area 120 is providing a benefit. If it is not providing a benefit, or if the benefit is not sufficient, then the processor 102 is preferably operable to reconfigure certain of the parameters of the software invoked cache memory area 120 in order to improve the benefit. Again, the parameters that may be modified include the number of cache lines, a definition of the specific areas of the system memory (element ID), the data element transfer size, the cache line replacement policy, etc.

By way of example, a suitable program for implementing one or more of the features of the software cache memory described hereinabove is provided below:

```
/* setup */
#define CACHE_BUF_NUM 4            /* cache-way number */
#define CACHE_BUF_SIZE 15*1024     /* cache-bank size */
/* structure area of software cache□used as 4way-SIMD-register */
static vector signed int cache_simd_buf_tag; /* tag-ID save area */
static vector signed int cache_simd_buf_status;   /* status save area */
                                                  /* 1:dirty, 0: other */
static vector signed int cache_simd_buf_tagnum; /* cache-line number */
static vector signed int cache_simd_buf_elementsize; /* cache-line size */
static vector unsigned int cache_simd_buf_addr; /* address of local storage
*/
static vector unsigned int cache_simd_buf_systemaddr; /* address of main
memory */
/* data for calculation:used as scalar register */
static unsigned int cache_buf_systemaddr; /* address of main memory */
static unsigned int cache_buf_elementsize; /* cache-line size */
static signed int cache_buf_tagnum; /* cache-line number */
/* cache buffer area */
static char cache_buf [CACHE_BUF_NUM] [CACHE_BUF_SIZE];
/* cache initialization */
void init_cache(unsigned int system_address, unsigned int element_size)
/* system_address: cache start address on main memory
    element_size: cache-line size */
{
    /* input value error handling */
    if (element_size > CACHE_BUF_SIZE || element_size < 1) {
       error handling
    }
    /* cache setup */
    cache_buf_systemaddr = system_address; /* cache start address on main
memory */
    cache_simd_buf_systemaddr = simd_splats(system_address); /* set to
4slot of SIMD register */
    cache_buf_elementsize = element_size; /* cache-line size */
    cache_simd_buf_elementsize = simd_splats(element_size); /* set to 4slot
of SIMD register */
    cache_buf_tagnum = CACHE_BUF_SIZE/element_size; /* cache-line number */
    cache_simd_buf_tag = simd_splats(-1); /* tag ID□initial value */
    cache_simd_buf_status = simd_splats(0); /* status: initial value */
    cache_simd_buf_addr = simd_set (cache_buf[0], cache_buf[1],
cache_buf[2], cache_buf[3]); /* set address value to 4slot*/
}
/* cache access */
void *get_cache_buf(int id, int control)
/* id: elementID
    contorl: 0 read□1 write */
{
    check which slot is same between 'id' and 'cache_simd_buf_tag'.
    /* cache-hit handling */
    set local address to 'simd_ret_addr' for return value
    if (in case first slot) {
          cache_simd_buf_status = simd_insert(control, cache_simd_buf_status,
0); /* insert control to first slot of status register */
          return((void*)simd_extract(simd_ret_addr, 0); /* return value of
first slot of local address register */
    }
    else if (in case second slot) {
          switch second slot and first slot of 'cache_simd_buf_tag' (LRU
algorithm)
          switch second slot and first slot of 'cache_simd_buf_status' (LRU
algorithm)
          switch second slot and first slot of 'cache_simd_buf_addr' (LRU
algorithm)
          cache_simd_buf_status = simd_insert(control, cache_simd_buf_status,
```

```
0); /* insert control to first slot of status register */
    return((void*)simd_extract(simd_ret_addr, 1); /* return value of
second slot of local address register */
  }
  else if (incase third slot) {
    rotate between third slot and first slot of
'cache_simd_buf_tag'(LRU algorithm)
    rotate between third slot and first slot of
'cache_simd_buf_status'(LRU algorithm)
    rotate between third slot and first slot of
'cache_simd_buf_addr'(LRU algorithm)
    cache_simd_buf_status = simd_insert(control, cache_simd_buf_status,
0); /* insert control to first slot of status register */
    return((void*)simd_extract(simd_ret_addr, 2); /* return value of
third slot of local address register */
  }
  else if (incase fourth slot) {
    rotate between fourth slot and first slot of
'cache_simd_buf_tag' (LRU algorithm)
    rotate between fourth slot and first slot of
'cache_simd_buf_status' (LRU algorithm)
    rotate between fourth slot and first slot of
'cache_simd_buf_addr' (LRU algorithm)
    cache_simd_buf_status = simd_insert(control, cache_simd_buf_status,
0); /* insert control to first slot of status register */
    return((void*)simd_extract(simd_ret_addr, 3); /* return value of
fourth slot of local address register */
  }
  /* cache miss handling: replace fourth slot */
  cache_buf_addr = simd_extract(cache_simd_buf_addr, 3); /* get cache-
local-address from fourth slot */
  if (incase cache-status is writen) {
    /* writeback handling */
    cache_buf_tag = simd_extract(cache_simd_buf_tag, 3); /* get tagID
from fourth slot */
    system_address = cache_buf_systemaddr + cache_buf_tag *
cache_buf_elementsize; /* calculate target address of main memory */
    Do DMA from local storage data pointed by 'cache_buf_addr' to main
memory data pointed by 'system address'
    change status of fourth slot of 'cache_simd_buf_status'
  }
  /* cache refill */
  new_tag = (id/cache_buf_tagnum)*cache_buf_tagnum;
  system_address = cache_buf_systemaddr + new_tag*cache_buf_elementsize;
  Do DMA from local storage area pointed by 'cache_buf_addr' to main
memory area pointed by 'system_address'
  cache_simd_buf_tag = simd_insert(new_tag, cache_simd_buf_tag, 3); /*
set new tag to fourth slot */
  cache_simd_buf_status = simd_insert(control, cache_simd_buf_status, 3);
/* set new status to fourth slot */
  return_address = cache_buf_addr + (id − new_tag) *
cache_buf_elementsize;
  return ((void*)return_address);
}
```

Figure 5:
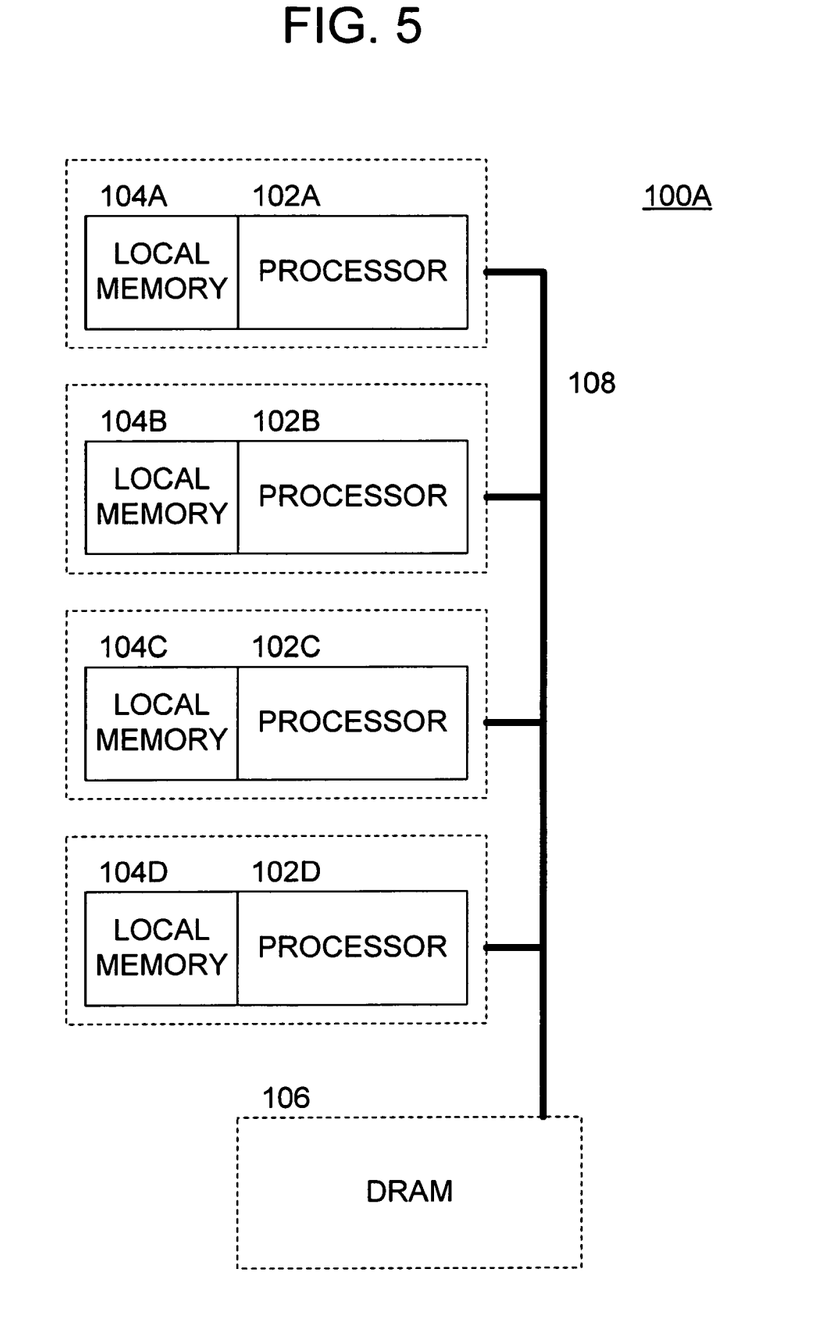
FIG. 5 is a diagram illustrating the structure of a multi-processing system having two or more sub-processors, one or more of which may include a local memory as in FIG. 2 having one or more software implemented cache memories in accordance with one or more further aspects of the present invention.

With reference to FIG. 5, the concepts discussed hereinabove with respect to FIGS. 1-4 may be applied to a multi-processing system 100A including a plurality of processors 102A-D, associated local memories 104A-D, and a main memory 106 interconnected by way of a bus 108. Although four processors 102 are illustrated by way of example, any number may be utilized without departing from the spirit and scope of the present invention. The processors 102 may be implemented with any of the known technologies, and each processor may be of similar construction or of differing construction.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 6:
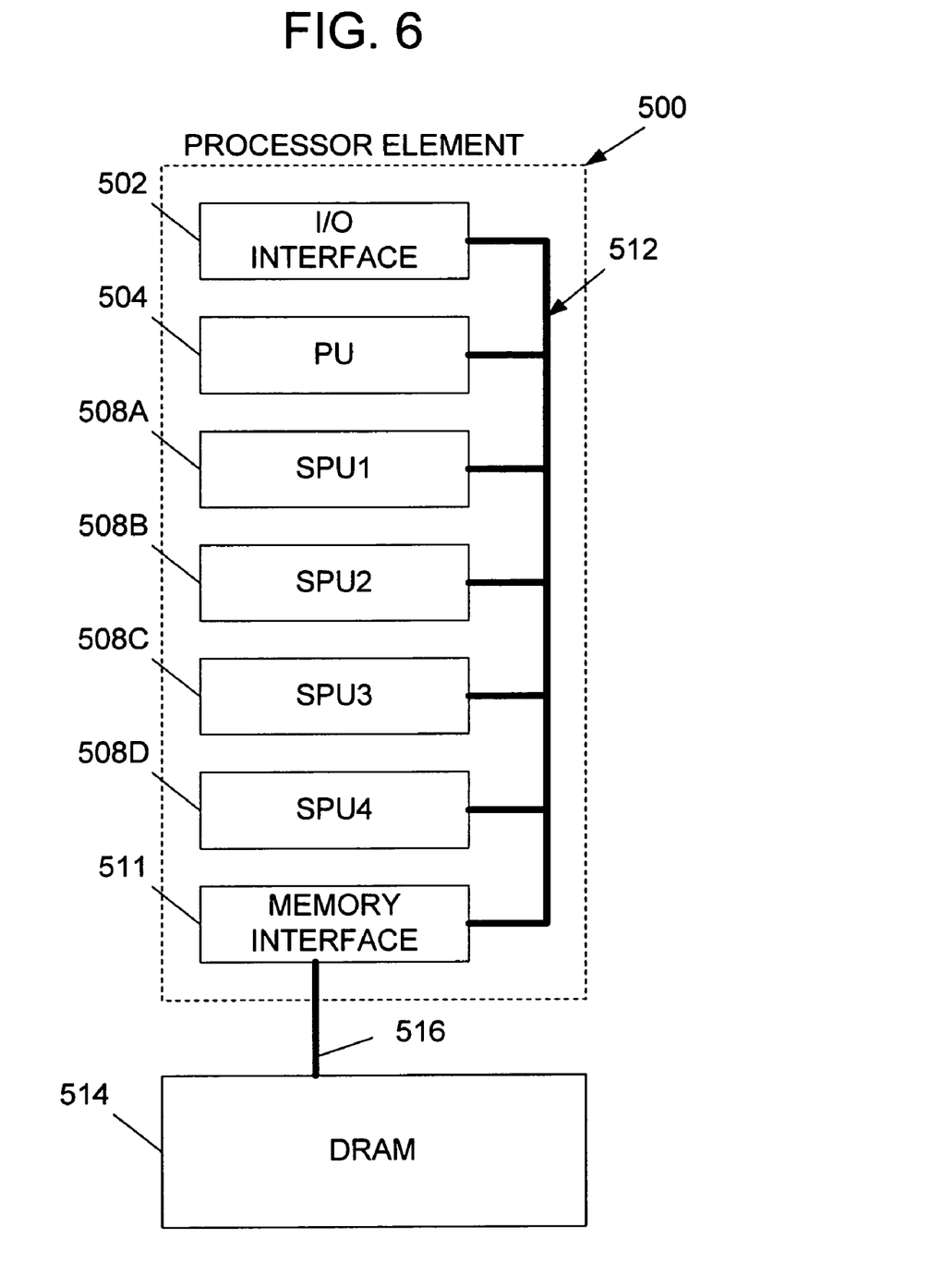
FIG. 6 is a block diagram illustrating a preferred processor element (PE) that may be used to implement the mutli-processor system in accordance with one or more further aspects of the present invention.

With reference to FIG. 6, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 7:
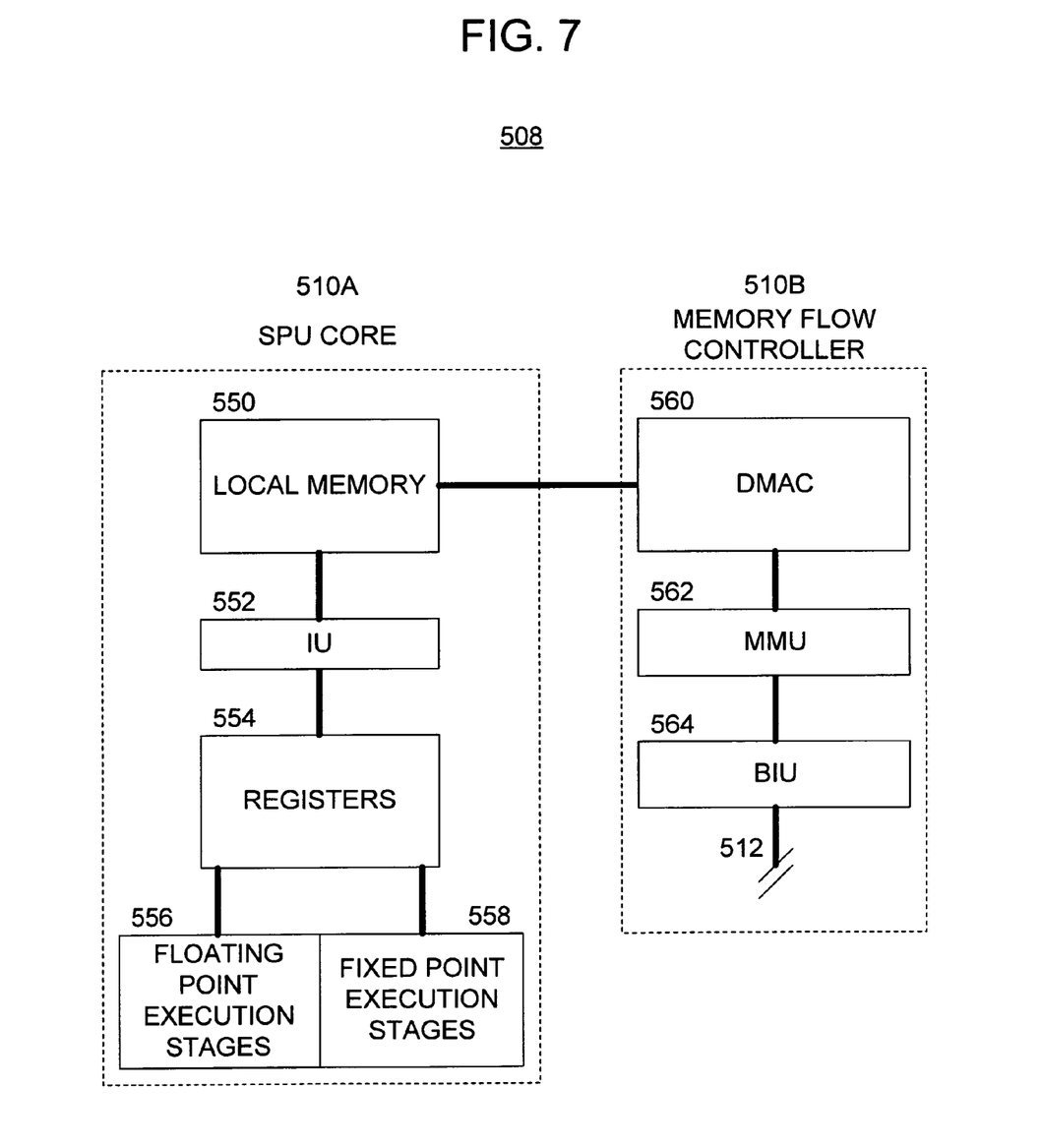
FIG. 7 is a block diagram illustrating the structure of an exemplary sub-processing unit (SPU) of the system of FIG. 6 in accordance with one or more further aspects of the present invention.

FIG. 7 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one ore more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 510A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 8:
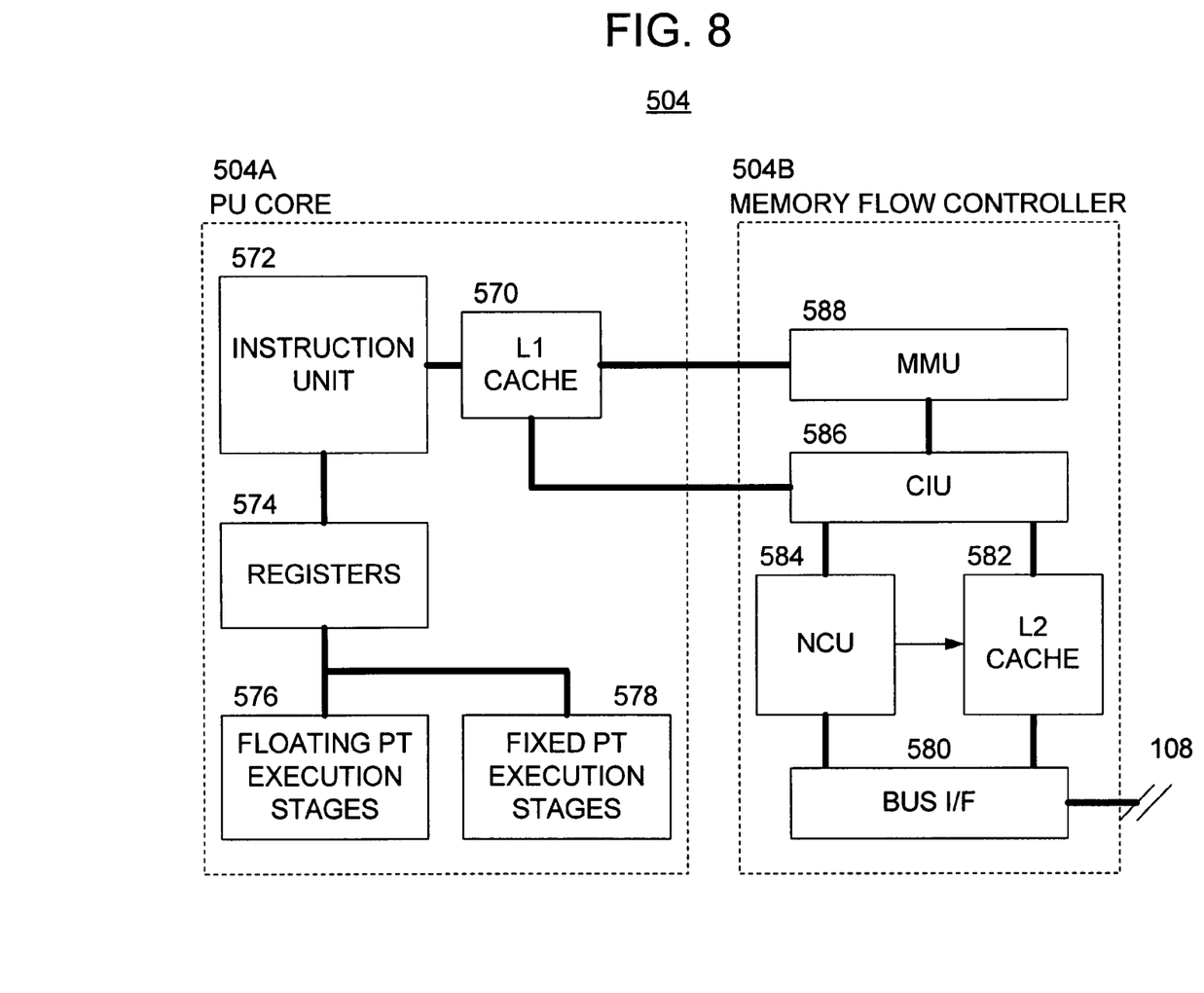
FIG. 8 is a block diagram illustrating the structure of a processing unit (PU) of the system of FIG. 6 in accordance with one or more further aspects of the present invention.

FIG. 8 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion);

(iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

As discussed above, various aspects of the present invention provide for the software implementation of a cache memory in a local memory of a processor. The number of distinct cache memory sections, the number of cache lines per memory, the number of tag comparisons per instruction, the line block size, and certain aspects of the replacement policy may be configured via the API codes. This provides a significant advantage over hardware implementations in which these parameters are fixed. Further, by monitoring the cache hit ratio and the access frequency, and computing the cache penalty, the cache configuration (i.e., the cache parameters listed above and/or others) may be automatically adjusted via software to improve processing performance.

Advantageously, the methods and apparatus for providing a software implemented cache memory, permit a programmer to exploit at least some of the advantages of a hardware implemented cache memory without requiring that the processor designer/manufacturer incur the disadvantageous cost implications in terms of expense and usage of chip space. Thus, substantial increases in memory efficiency, processing throughputs, and processing quality are obtained.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
   at least one main processor coupled to a hardware implemented cache memory and coupled to a main memory, where the main processor obtains data from the main memory for storage in the cache memory;
   a plurality of sub-processors, each coupled to the at least one main processor, each coupled to the main memory, and each obtaining at least some of the data from the main memory;
   a respective local memory disposed on-chip with at least each sub-processor and connected therewith such that the data is stored for use by the at least each sub-processor, the local memory not being a hardware cache memory,
   wherein at least each of the sub-processors executes application program interface code that configures the respective local memory thereof to include at least one software invoked cache memory area therein.

2. The apparatus of claim 1, wherein the main processor, hardware cache memory, sub-processors and local memories are disposed on a common semiconductor chip.

3. The apparatus of claim 2, wherein the main memory is also disposed on the common semiconductor chip.

4. The apparatus of claim 1, wherein each of the sub-processors specifies at least one of the following parameters using the application program interface code:
   a number of cache lines to include in the at least one software invoked cache memory area;
   a size of the cache lines;
   specific areas of the main memory from/to which to read/write the data;
   a data size of the data that read from, or written to, the main memory in each such read/write cycle; and
   a cache line replacement policy.

5. The apparatus of claim 1, wherein the processor executes application program interface code that configures the local memory to include a plurality of distinct software invoked cache memory areas therein.

6. An apparatus, comprising:
   at least one main processor coupled to a hardware implemented cache memory and coupled to a main memory, where the main processor obtains data from the main memory for storage in the cache memory;
   a plurality of sub-processors, each coupled to the at least one main processor, each coupled to the main memory, and each obtaining at least some of the data from the main memory; and
   a respective local memory disposed on-chip with at least each sub-processor and connected therewith such that the data is stored for use by the at least each sub-processor, the local memory not being a hardware cache memory.

7. The apparatus of claim 6, wherein the processors and associated local memories are disposed on a common semiconductor substrate.

8. The apparatus of claim 6, further comprising the shared memory coupled to the processors over a bus.

9. The apparatus of claim 8, wherein the processors, associated local memories, and the shared memory are disposed on a common semiconductor substrate.

* * * * *